United States Patent

[11] 3,626,280

| [72] | Inventors | Clarence A. Van Englehoven<br>Marion;<br>David L. Richter, Cedar Rapids, both of Iowa |
|---|---|---|
| [21] | Appl. No. | 25,478 |
| [22] | Filed | Apr. 3, 1970 |
| [45] | Patented | Dec. 7, 1971 |
| [73] | Assignee | Collins Radio Company<br>Cedar Rapids, Iowa |

[54] FREQUENCY CONTROLLED FLUX DETECTOR EXCITATION
8 Claims, 17 Drawing Figs.

[52] U.S. Cl. .......................................................... 324/43 R,
331/74, 331/113 A
[51] Int. Cl. ................................................................ G01r 33/02
[50] Field of Search ........................................ 324/43 R,
47; 323/89 R; 330/8; 331/113 A, 74

[56] References Cited
UNITED STATES PATENTS

| 3,551,845 | 12/1970 | Zelina ........................ | 331/113.1 |
| 3,427,534 | 2/1969 | Maxwell ...................... | 324/43 |
| 3,210,654 | 10/1965 | Biderman et al. ............. | 331/113.1 |
| 2,786,179 | 3/1957 | Arnold et al. ................ | 324/43 |

Primary Examiner—Rudolph V. Rolinec
Assistant Examiner—R. J. Corcoran
Attorneys—Richard W. Anderson and Robert J. Crawford ABSTRACT: A flux detector saturation control circuit senses core saturation time for monitoring rate of change of current through the core drive winding. A frequency control loop for the core driving source is responsive to saturation detection to maintain a time symmetry between a driving source synchronizing waveform and core saturation time occurrences such that saturation is caused to occur midway in successive half-cycles of the driving source waveform.

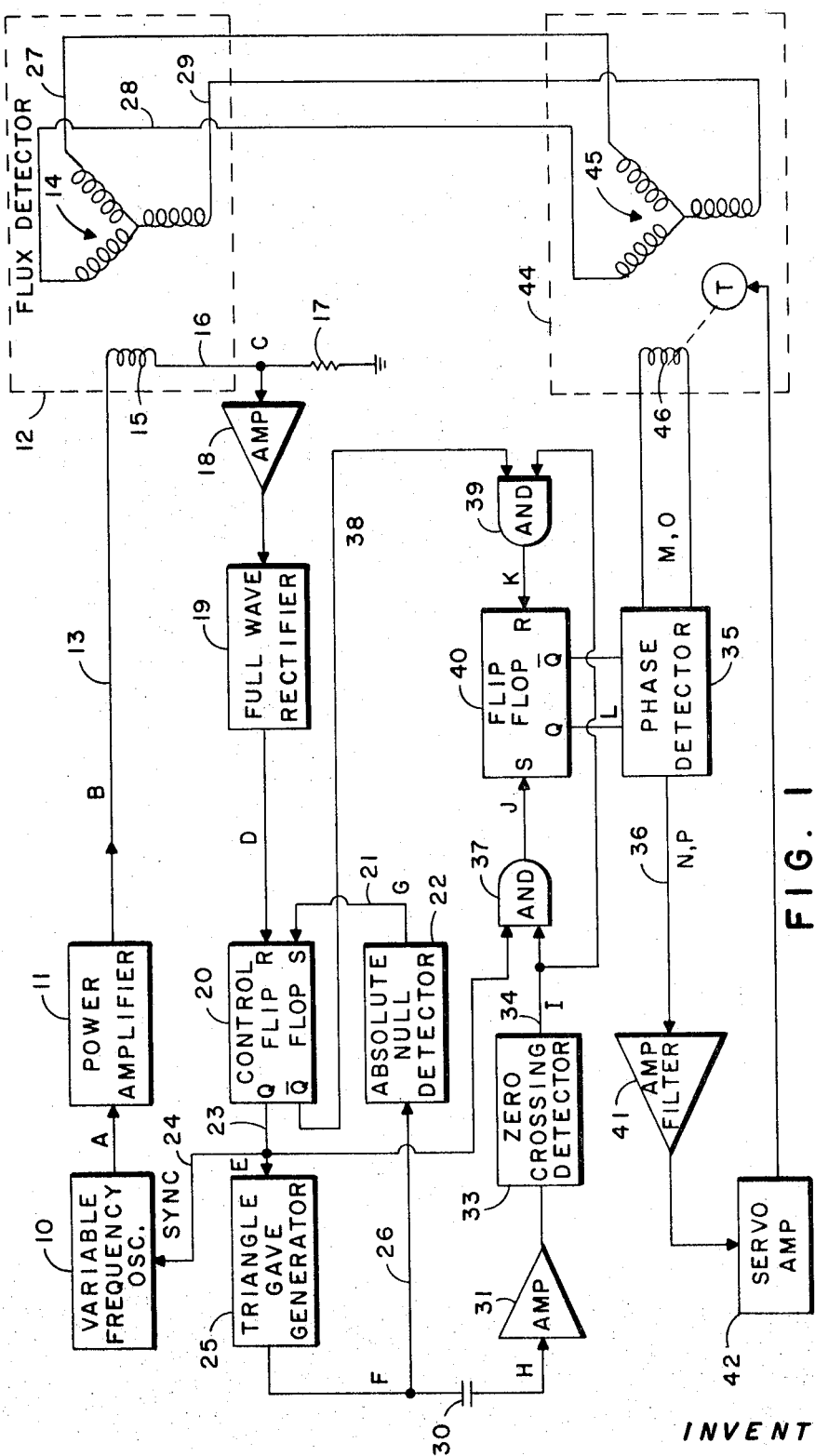

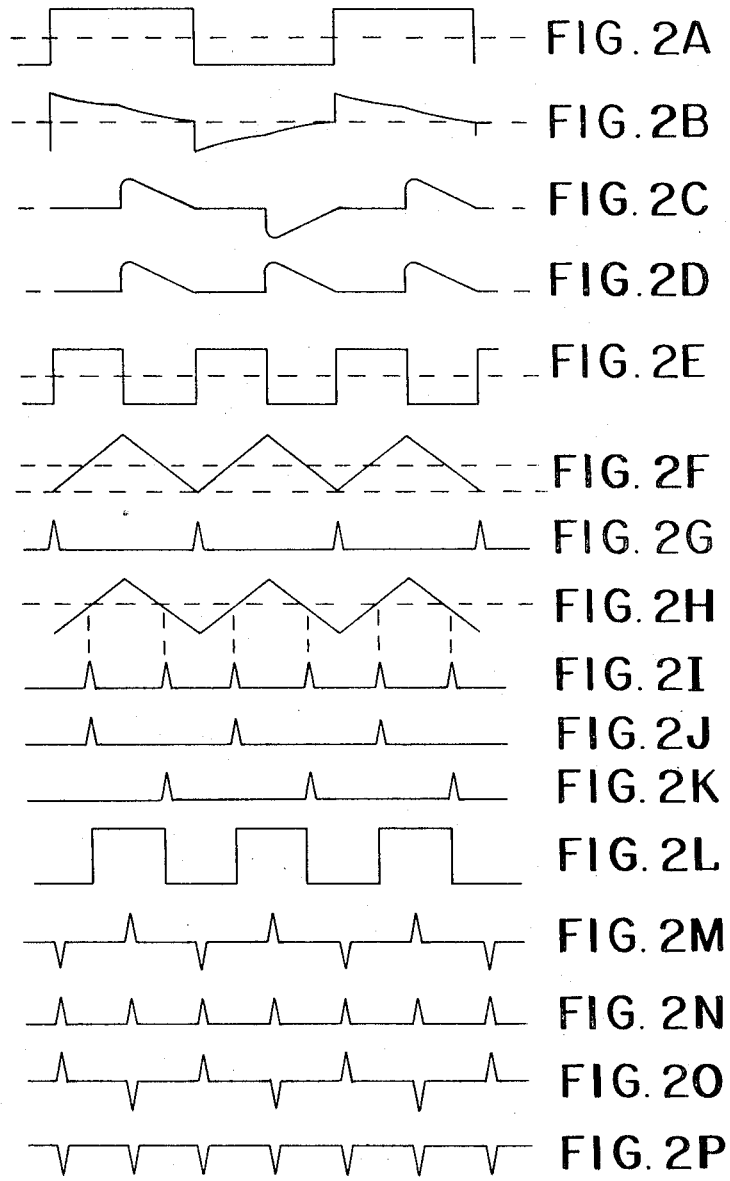

FREQUENCY CONTROLLED FLUX DETECTOR EXCITATION

This invention relates generally to magnetic measuring means and more particularly to an improved flux detector excitation means.

Known magnetic flux detectors as employed, for example, in compass systems comprise three-phase pickup coils to which the earth's magnetic field is intermittently applied. One such known flux detector is described in U.S. Pat. No. 2,786,179 to D. C. Arnold et al., assigned to the assignee of the present invention wherein a shielding means in the form of a saturable core surrounds a three-phase pickup winding. The shielding means, in being constructed of saturable material may be caused to periodically saturate and unsaturate. During the periods of time when the outer core member or shield is unsaturated it provides a lower resistance path to the earth's magnetic field and essentially shields the three-phase winding from the earth's magnetic field. During those intervals of time when the outer core member is saturated the earth's magnetic field passes through the shield member and induces a particular permutation of voltages in the three-phase winding contained therein. The relative magnitudes and polarities of the induced signals are definitive of the angular relationship of the three-phase winding with respect to the earth's magnetic field. Systems of this type employ detection systems utilizing servo or phase detector techniques or combinations of both to extract information in a usable form to provide direction indication.

In flux detectors employing a periodically saturated outer core each of the pickup windings has induced therein a pulse at the instant of outer core saturation. The amplitude and polarity of the pulses developed in the three windings is peculiarly dependent upon the angular orientation of the pickup windings with respect to the lines of flux passing through the outer core. Systems translating this three-wire information into usable form may employ phase detectors and reference phase shifting techniques. As such, they are prone to inaccuracies since the flux detector output can be shifted in phase from the input through the flux detector, capacitors used to effect the necessary phase shifts for subsequent detection implementations may vary the amount of actual phase shift induced, and, most importantly, the point at which the flux detector saturates may vary from one detector to another, such that the peaks of voltage induced in the pickup windings move about in time reference. The peaks may actually move into another part of the half cycle and cause a reduction in the output from known phase detecting techniques employed with flux detectors.

It is, of course, very important not to lose any signal since the signal induced by the earth's magnetic field is extremely small to begin with. The problem encountered with known systems is that different flux detectors exhibit peculiarly different saturation characteristics and, therefore, different outputs.

It is accordingly an object of the present invention to provide an improved flux detector excitation control circuitry wherein saturation is caused to always occur in the middle of successive half cycles of the saturating control signal. This approach assures more uniform output and permits improved phase detection of the output signal.

A further object of the present invention is the provision of a flux detector excitation circuitry minimizing ringing caused by overdriving the outer core member.

The invention is featured in the provision of a drive circuitry for a magnetic flux detector wherein an alternative current signal source effecting periodic saturation of the outer core member is controlled in frequency as a function of the saturation characters of the saturable core member by being incorporated in a control loop employing sensing of the rate of change of current in the core member winding. Symmetrical control development circuitry effects frequency control of the driving source such that core saturation is effected precisely in the center of successive half cycles of the drive signal.

These and other features and objects of the present invention will become apparent upon reading the following description with reference to the accompanying drawings in which:

FIG. 1 is a functional block diagram of an improved frequency controlled flux detector excitation's scheme in accordance with the present invention; and FIG. 2 (A)–2(P) are diagrammatic representations of operational waveforms in the embodiment of FIG. 1.

The flux detector excitation circuitry of the present invention is comprised generally of a control loop including the flux detector saturable core winding, an oscillator which develops a drive voltage which periodically saturates the flux detector control winding, a sensing means detecting rate of change of current in the core winding to develop a control signal the timing of which is time synchronous with the periodic saturation of the flux detector coil, and further control circuitry which develops a control waveform time synchronized with the saturation of the flux detector coil and bearing a symmetrical relationship with respect to this time occurrence. The latter control signal is utilized to control the frequency of the driving oscillator in such a manner that the flux detector core member is saturated precisely in the middle of successive half cycles of the driving source.

This basic control loop assures that various flux detectors exhibiting peculiarly different saturation characteristics will always be caused to saturate in the middle of successive half cycles of the drive oscillator source. The driving source frequency then adjusts itself to the characteristics of the particular saturable core member. The result is the attainment of uniform saturation control of flux detectors exhibiting different characteristics. With the assurance that the flux detector saturation times have a precise time relationship with the driving source signal, subsequent phase detecting techniques for extracting information from the flux detector pickup coil outputs are greatly simplified since reference or driving signal for detection implementations (bearing precise time relationship with the driving source) are likewise assured of having a precise symmetrical time relationship with the flux detector output impulses.

As briefly described above, the present invention operates by sensing the rate of change of current in the saturable core drive winding associated with the flux detector. Rate of change of current yields saturation data since the current increases sharply at the instant of core saturation. The rate of change of current thus yields a precise measure of the time occurrence of saturation about which time the control circuitry of the present invention effects a closed loop control of the driving oscillator source in a manner such that the time occurrence of core saturation is caused to appear in the middle of successive half cycles of the driving signal.

The present invention will first be described in terms of the basic control loop by means of which saturation of the outer core of the flux detector may be caused to occur precisely in the middle of successive half cycles of the driving source. This basic loop is illustrated in the upper portion of FIG. 1. The driving source comprises a variable frequency oscillator 10 and a power amplifier 11. The oscillator may comprise a multivibrator the pulse repetition rate of which is controllable over some predetermined range. Multivibrator 10 applies a periodic train of impulses to power amplifier 11 the output 13 of which is applied to the control or drive winding 15 of a flux detector 12. The winding 15 might be returned to ground through a load member 17. The signal developed across load member 17 is proportional to the current flow through the flux detector drive winding 15. This signal exhibits a sharp impulse during successive half cycles of the driving oscillator signal at the instant of core saturation, it being realized that the core member saturates on both the positive and the negative half cycles of the driving signal 13. The time occurrence of the impulse is due to sharp increases in current through the winding 15 each time the core saturates.

As indicated in FIG. 1, the current sensing impulses (alternately positive and negative going) are amplified in amplifier 18 and applied to a full wave rectifier 19 the output of which comprises a series of like polarity impulses time coincident with saturation times of the core member. The output from rectifier 19 is applied to a reset terminal of a control flip-flop 20 to drive flip-flop 20 to a first conductive state. The Q output from flip-flop 20, designated by reference numeral 23, is applied through line 24 as a synchronizing input to the driving oscillator source 10 and additionally as a timing waveform to triangle wave generator 25 the output 26 of which is applied to an absolute null detector 22. The output from null detector 22 is applied as a "set" input to the control flip-flop 20 to drive flip-flop 20 to a second conductive state.

Operation of the saturating control loop of FIG. 1 might best be comprehended by reference to the waveforms of FIGS. 2(A)–2(P). FIG. 2(A) depicts the output from the variable frequency oscillator 10 in the form of a symmetrical square wave of a predetermined repetition rate. The output from power amplifier 11 is illustrated in FIG. 2(B). Power amplifier 11 may have a capacitor output to give it a fall-off characteristic to prevent ringing. FIG. 2(C) depicts the current flow through the flux detector winding 15 wherein a sharp increase in current flow occurs at periodic intervals corresponding to the time of core saturation. Full wave rectifier 19 converts the current waveform to positive impulses FIG. 2(D) which are applied to reset control flip-flop 20, the Q output of which is shown in FIG. 2(E).

Control flip-flop 20 is initially set by the output 21 from an absolute null detector so that the Q output from flip-flop 20 is high as indicated in FIG. 2(E). It is to be understood that the waveforms depicted in FIGS. a(A)–2(P) illustrate a steady state control situation during which the loop has assumed control of the frequency of oscillator 10. Thus FIG. 2(E) illustrates the Q output of the control flip-flop as being at a high level at the beginning of a cycle of drive signal from oscillator 10. This high Q output is applied to a triangle wave generator 25 and at this instance in time the triangle wave generator 25 initiates a linearly increasing output voltage. Triangle wave generator 25 acts as an integrator of the Q output waveform from flip-flop 20 and might be comprised of any one of a number of known expedients including an RC network charging and discharging under the control of the Q output from control flip-flop 20. The output from triangle wave generator 25 FIG. 2(F) continues to rise linearly until the Q output from control flip-flop 20 switches to zero. The time occurrence of this level change is controlled by impulses corresponding to saturation times of the flux detector core. With the Q output from control flip-flop 20 at a low level the output of the triangle wave generator discharges linearly towards the zero level. The zero level of the output from triangle wave generator 25 is detected by applying the output through line 26 to an absolute null detector 22 the function of which is to develop an output pulse on line 21 (FIG. 2(G)) and reset control flip-flop 20 when the output from the triangle wave generator 25 falls to substantially zero volts. In an actual embodiment this detection occurs when the triangle wave generator output falls to approximately 0.6 volts.

The loop thus far described causes the core member in the flux detector 12 to saturate precisely in the middle of successive half cycles of the output from variable frequency oscillator 10 since the Q output from the control flip-flop 20 FIG. 2(E) is applied on line 24 as a synchronizing input to the variable frequency oscillator 10. It is noted that the triangle wave generator generates a symmetrical wave the peak of which occurs at the middle of successive half cycles of the output from variable frequency oscillator 10. The control flip-flop is set at the zero levels of the triangle wave generator output and reset at the time occurrences of the current impulses from the drive winding 15 of the flux detector. Note then that the Q output from control flip-flop is the second harmonic of the driving oscillator 10.

The above-described control loop operation controls the frequency of variable frequency oscillator 10 such that the successive half cycles of waveform applied to saturate the core of flux detector 12 are symmetrically disposed about the instances of time at which saturation of the core member is effected. The time occurrences of saturation during successive half cycles are determined by sensing rate of change of current and the control flip-flop waveform is generated on a symmetrical basis with respect to these times by the inclusion of the triangle wave generator circuitry. Thus, should flux detectors of different saturation characteristics be operated in circuit with the control loop, the control circuitry would synchronize the variable frequency oscillator to an appropriate higher or lower frequency such that the saturation would occur at times corresponding to the exact center of successive half cycles of the oscillator driving waveform.

The control loop of the upper portion of FIG. 1, therefore, illustrates an improved means to make flux detectors look "more like." so that flux detectors of variable saturation characteristics may be employed in a given control circuitry with the assurance that saturation still occurs precisely in the center of the saturation excitation oscillator waveform.

In addition to providing a means wherein the outer core member of the flux detector is caused to saturate precisely on a synchronous basis with respect to a controlling waveform, the present invention, by an extension to be further described, provides definite improvements in phase detection techniques by means of which informational outputs are generated and utilized. With reference to FIG. 1, the output from the triangle wave generator 25 may be applied through a capacitor 30 so as to convert the DC waveform from the triangular wave generator to a symmetrical AC waveform. After amplification in amplifier 31, the AC waveform may be applied to a zero-crossing detector 33 the latter comprising any one of a known number of expedients by means of which a pulse output is generated at the precise times that an applied input signal goes through zero potential.

The triangle wave generator output of FIG. 2(F) after application through capacitor 30, is illustrated as the AC symmetrical waveform of FIG. 2(H). The output from the zero-crossing detection 33 is depicted as a series of pulses timed at the zero crossings of the FIG. 2(H) waveform. Reference to the FIG. 2(I) waveform indicates that the pulse outputs from the zero-crossing detector 33 lie midway between the pulses out of flux detector 12. Pulses out of flux detector 12, the time occurrences of which correspond to that of the waveforms of FIG. 2 (M) and FIG. 2 (O), occur at the periods of time when the flux detector core saturates (these periods lying in the middle of successive half cycles of the driving waveform from oscillator 10). Opposite polarity pulses are generated when the core becomes unsaturated at times corresponding to the trailing edge of the flux detector current waveforms. A driving or reference waveform for a phase detector 35 which might, in a typical gyro stabilized compass or other type of system, receive the flux detector input pulses from a transolver 44, may be precisely developed by the inclusion in the control circuitry of a further flip-flop 40. Flip-flop 40 may be controlled by ANDing the output of the zero-crossing detector 34, as depicted in FIG. 2(I) with both the Q and $\overline{Q}$ outputs of control flip-flop 20 (the Q output being depicted in 2(E). Thus the zero-crossing detector output 34 FIG. 2(G), when ANDed with the Q output from control flip-flop 20 FIG. 2 (E)) in AND-gate 37, develops a train of flip-flop pulses FIG. 2(J) When the output from the zero crossing detector 33 FIG. 2 (I) is ANDed with the $\overline{Q}$ output from control flip-flop 20, a train of flip-flop "reset" pulses (FIG. 2(K)) is generated. The Q output from the phase detector control or reference flip-flop 40 (FIG. 2(L) is seen to be symmetrically disposed with respect to the flux detector pulses from transolver 44.

Phase detector 35 has the flux detector output pulses applied as a first input thereto and the output from phase detector flip-flop 40 applied as a reference input. Phase detector 35 might employ the known expedient of utilizing the phase detector flip-flop output to operate a chopper which alternately shorts the secondaries of a transformer the primary winding of which receives the flux detector output. The center tap of the transformer is then a full-wave phase sensitive output which may be applied through a filter amplifier 41 to drive a servo 42. Servo 42, in turn, might mechanically torque the gyro gimbal to which the rotor of transolver 44 is affixed and position the rotor for a null.

The output from the rotor 46 of gyro transolver 44 FIGS. 2(M), 2(0) bears a particular "phase" relationship with respect to the Q and $\overline{Q}$ outputs of phase detector driving flip-flop 40. That is to say, depending upon the particular quadrant of heading orientation with respect to the earth's magnetic field, the first such pulse in the indicated waveform might be either negative or positive going. Alternate ones of the pulses are, of course, of opposite polarity. The phase detector 35, in effect, full-wave rectifies the flux detector output from transolver 44 and develops a DC output which is either negative or positive depending upon the particular zero or 180° phase relationship of the flux detector output from the transolver with respect to the reference signal from flip-flop 40. In essence, the transolver output is of one particular phase on one side of the null and of reverse phase or 180° out of phase on the other side of the null. The amplitude of the pulses is a function of the angular displacement of the transolver rotor winding 46 from null. Thus the output from the phase detector is of one polarity or another depending upon whether the transolver rotor position leads or lags the null position, and of an amplitude corresponding to angular displacement of the transolver rotor from the null (see FIGS. 2(L) through 2(P)).

A gyro stabilized compass system is thus realized wherein the "phase detecting" in the null positioning servo loop is attained with an exacting control since the system inherently generates drive voltages the (the Q and $\overline{Q}$ outputs from the phase detector flip-flop 40) which are symmetrically disposed about successive ones of the flux detector output pulses. The system inherently assures that the transolver output pulses, as generated timewise by the flux detector 12, lie in the precise center of the phase detector drive or reference waveform, thus the amplitude and complete duration of each of the pulses is precisely utilized in developing the DC analog output which in turn drives the loop to null.

The present invention thus permits precisely stabilized phase detection schemes as compared to known methods wherein the output from the flux detector might shift in time with respect to the detector drive or reference signal, depending upon the particular saturation characteristics of the core member employed.

The present invention is thus seen to provide a novel and improved means for controlling the flux detector excitation in such a manner that saturation of the core member in the flux detector is caused to occur precisely in the center of subsequent half cycles of the driving waveform whereby a reference is established for a precise phase detecting arrangement without necessity of including a phase shifting capacitor as in known systems. The time occurrence of the pulse outputs from the flux detector pickup windings 14, as applied through lines 27, 28, and 29 to the stator 45 of the transolver 44, is fixed as concerns the driving source 10 and the entire system provides an inherently stabilized reference for numerous phase detection implementations. The control is self-adjusting to compensate for variations in the saturation characteristics of flux detectors employed.

Although this invention has been described with respect to a particular embodiment thereof, it is not to be so limited as changes might be made therein which fall within the scope of the invention as defined in the appended claims.

We claim:
1. Excitation means for a saturable core member of a magnetic flux detector comprising a driving winding member on said such saturable core member, a source of variable frequency alternating current drive signal applied to said winding member, said driving signal being of a magnitude sufficient to saturate said core member at a predetermined point of time during the occurrence of successive half cycles of driving signal source, means for sensing the rate of change of current through said winding member, and means responsive to said rate of change of current means to control the frequency of said driving signal source to cause said core member to be driven into saturation at sequential periods of time corresponding to the midpoint of successive half cycles of said driving signal.

2. An excitation control means as defined in claim 1 wherein said means for controlling the frequency of said driving signal source comprises a control flip-flop including a reset terminal responsive to said current sensing means to reset said flip-flop in response to successive current impulses the time occurrence of which defines the successive saturation times of said core member, triangle wave generating means responsive to an output signal from said control flip-flop to develop an output signal proportional to the time interval of said flip-flop output signal, signal null detecting means receiving the output from said triangle wave generating means and being responsive thereto to develop an output pulse when the output of said triangle wave generator decreases to substantially zero volts, the output pulses from said null detecting means being applied to set said control flip-flop, and said output from said control flip-flop means being additionally applied as a synchronizing input to said variable frequency driving signal source, whereby said saturable core member is driven into saturation as detected by said current sensing means at the midway points of successive half cycles of said driving signal source.

3. An excitation means as defined in claim 2 wherein the output from said current sensing means is applied to a full-wave rectifying means the output of which is applied to said reset terminal of said control flip-flop means.

4. An excitation means as defined in claim 3 wherein said driving signal source comprises an astable multivibrator the output of which is a symmetrical square wave of sufficient magnitude that successive half cycles thereof effect saturation of said core member at a predetermined time period within successive half cycle periods, said means for synchronizing the driving signal source comprising means for synchronizing the repetition rate of said astable multivibrator one-half the repetition rate of said control flip-flop synchronizing output as applied to said multivibrator.

5. A control means as defined in claim 4 wherein said saturable core member comprises the control member of a flux detector, said flux detector comprising pickup windings having induced therein signal impulses during the saturated time intervals of said core member and having relative polarity and magnitudes depending upon the direction of detectable flux lines with respect to the angular orientation of said pickup windings, said control means further comprising means for converting the output from said triangle wave generating means to a symmetrical alternating current wave, zero-crossing detector means receiving said alternating current wave and producing output impulses in time correspondence with zero crossings of the voltage applied thereto, a first AND gate receiving said control flip-flop output waveform and the output of said zero-crossing detector as respective inputs thereto, a second AND gate means receiving the complementary output from said control flip-flop and the output from said zero-crossing detector as respective inputs thereto, the output from said first and second AND gates being applied as respective set and reset input signals to a further flip-flop; a phase detector, transolver means including a rotor and a stator for converting the output from said flux detector pickup windings to a two-wire output, means applying said two-wire output and at least one of the complementary outputs from said further flip-flop as respective inputs to said phase detecting means, said phase detecting means being adapted to develop a DC output signal the amplitude and polarity of which are respectively proportional to the extent and direction of the angular relationship between the rotor of said transolver and a predetermined null position thereof, and servo positioning means responsive to the output from said phase detector to effect an angular positioning of said transolver rotor to a null position.

6. Means for controlling the excitation of a saturable core member of a magnetic flux detector, having an energizing winding associated therewith and a source of alternating current excitation signal applied to said winding, comprising means to detect the time occurrence of saturation of said core member during successive half-cycles of said alternating current excitation voltage, and control means responsive to the time occurrences of said successive saturation times to control the frequency of said alternating current driving source to cause said saturable core member to be saturated at successive times corresponding to the midpoints of successive half cycles of said alternating current excitation signal.

7. Means for controlling the excitation of a saturable core member of a magnetic flux detector having an energizing winding to which a source of alternating current drive voltage is applied to effect saturation of said saturable core member midway between successive half cycles of said driving source, comprising means for sensing the rate of change of current through said energizing winding, said current sensing means developing output pulses in time correspondence with the initiation of successive saturation periods, a control flip-flop, means for driving said control flip-flop to a first conductive state in response to said successive pulses from said current sensing means, signal integrating means receiving the output from said control flip-flop, means responsive to voltage null points of the output of said integrator to drive said flip-flop to a second conductive state, and means for synchronizing the repetition rate of said driving source to one-half the repetition rate of the output from said control flip-flop.

8. Means as defined in claim 7 wherein said voltage integrating means comprises a triangle wave generator responsive to said first conductive state of said control flip-flop output to generate a linearly increasing waveform and responsive to said second conductive state of said control flip-flop to generate a linearly decreasing waveform at the same rate, the output from said triangle wave generator being applied to a null detector, said null detector developing an output pulse for driving said control flip-flop to said second conductive state thereof in response to the output from said triangle wave generator decreasing to a predetermined minimum voltage level.

\* \* \* \* \*